(12) United States Patent
Thies

(10) Patent No.: US 9,579,865 B2
(45) Date of Patent: Feb. 28, 2017

(54) WRITING, DRAWING, PAINTING OR COSMETIC DEVICE COMPRISING A HONEYCOMB BODY, AND METHOD FOR PRODUCING THE HONEYCOMB BODY OR THE DEVICE COMPRISING A HONEYCOMB BODY

(75) Inventor: Andreas Thies, Effeltrich (DE)

(73) Assignee: STAEDTLER MARS GMBH & CO. KG, Nürnberg (DE)

( * ) Notice: Subject to any disclaimer, the term of this patent is extended or adjusted under 35 U.S.C. 154(b) by 548 days.

(21) Appl. No.: 14/235,527

(22) PCT Filed: Jul. 5, 2012

(86) PCT No.: PCT/EP2012/002811
§ 371 (c)(1),
(2), (4) Date: Jan. 28, 2014

(87) PCT Pub. No.: WO2013/013762
PCT Pub. Date: Jan. 31, 2013

(65) Prior Publication Data
US 2014/0162007 A1   Jun. 12, 2014

(30) Foreign Application Priority Data

Jul. 28, 2011  (DE) .................. 10 2011 109 177

(51) Int. Cl.
| | |
|---|---|
| *B32B 3/12* | (2006.01) |
| *A45D 40/20* | (2006.01) |
| *B43K 8/00* | (2006.01) |
| *B43K 19/02* | (2006.01) |
| *B43K 19/14* | (2006.01) |
| *B43K 19/16* | (2006.01) |

(Continued)

(52) U.S. Cl.
CPC ................ *B32B 3/12* (2013.01); *A45D 40/20* (2013.01); *B32B 1/08* (2013.01); *B43K 7/005* (2013.01); *B43K 8/003* (2013.01); *B43K 19/02* (2013.01); *B43K 19/14* (2013.01); *B43K 19/16* (2013.01); *B43L 19/0075* (2013.01); *Y10T 428/1393* (2015.01)

(58) Field of Classification Search
CPC ....... B32B 1/08; B32B 3/12; Y10T 428/1393; A45D 40/20; B43L 19/0075; B43K 8/003; B43K 19/02; B43K 19/14; B43K 19/16; B43K 7/005
See application file for complete search history.

(56) References Cited

U.S. PATENT DOCUMENTS

| | | |
|---|---|---|
| 6,019,533 A | 2/2000 | Smith |
| 6,572,295 B1 | 6/2003 | Chochoy et al. |
| 8,188,175 B2 | 5/2012 | Lins et al. |

FOREIGN PATENT DOCUMENTS

| | | | |
|---|---|---|---|
| DE | 801613 | | 1/1951 |
| DE | 2144053 | * | 3/1972 |

(Continued)

*Primary Examiner* — Michael C Miggins
(74) *Attorney, Agent, or Firm* — Lucas & Mercanti, LLP; Klaus P. Stoffel

(57) ABSTRACT

A writing, drawing, painting or cosmetic device having at least one honeycomb body formed from a plastic material and/or a composite material consisting of a natural material and a plastic material. The at least one honeycomb body contains a plurality of hollow longitudinal structures that are axially parallel to one another.

13 Claims, 2 Drawing Sheets

(51) Int. Cl.
*B43L 19/00* (2006.01)
*B43K 7/00* (2006.01)
*B32B 1/08* (2006.01)

(56) References Cited

FOREIGN PATENT DOCUMENTS

| | | |
|---|---|---|
| DE | 102008034013 | 1/2010 |
| EP | 1150847 | 3/2007 |
| FR | 944811 | 4/1949 |
| JP | 2010-036372 | 2/2010 |

* cited by examiner

WRITING, DRAWING, PAINTING OR COSMETIC DEVICE COMPRISING A HONEYCOMB BODY, AND METHOD FOR PRODUCING THE HONEYCOMB BODY OR THE DEVICE COMPRISING A HONEYCOMB BODY

The present application is a 371 of International application PCT/EP2012/002811, filed Jul. 5, 2012, which claims priority of DE 10 2011 109 177.0, filed Jul. 28, 2011, the priority of these applications is hereby claimed and these applications are incorporated herein by reference.

BACKGROUND OF THE INVENTION

The invention relates to a writing, drawing, painting or cosmetic device and to a method for production thereof or method for producing elements of the device.

Honeycomb bodies and the principle structure thereof are known from catalytic converter engineering, for example from catalytic converter engineering for motor vehicles. Honeycomb bodies of this type are generally characterised by a low density with simultaneously high strength. These honeycomb bodies are usually formed from expensive ceramic or expensive materials and have a large number of hollow longitudinal structures, generally arranged axially parallel to one another.

Honeycomb bodies are understood hereinafter to be encasements or other elements for writing, drawing, painting or cosmetic devices. Devices of this type include, inter alia, pencils, such as lead pencils, colored pencils or cosmetic pencils with coloring leads, wherein the leads thereof are held non-displaceably in encasements and have to be sharpened in order to be functional. This is also true for devices of which the leads consist of eraser material.

Furthermore, honeycomb bodies can be used in a versatile manner as elements of/for writing, drawing, painting or marking devices, such as ball-point pens, fine lead pencils or clutch pencils, etc. Examples of elements that can be formed from honeycomb bodies include shafts, handles, closure caps, grip zones, coloring leads and clips.

Further elements include intermediate products for the production of devices of this type, for example what are known as small boards as are known from the conventional production of wood-cased pencils.

For example, encasements of wood-cased pencils that consist of wood, wood substitute materials or thermoplastics are known from the prior art.

The wood substitute materials have been used more recently in order to preserve natural woods and wood resources.

One form of these 'wood substitute materials' is constituted by what are known as wood plastic composites (WPCs), which are thermoplastically processable materials containing different proportions of wood, plastic materials and additives that are processed by thermoplastic forming methods, such as extrusion, injection molding or pressing.

An example for the use of WPC for wood-cased pencils can be found in DE 10 2008 034 013 A1, the WPC as a wood substitute material having isotropic homogeneous physical properties.

Generally, WPC has a very high density (>1.0 g/cm3), higher than the density of woods used for lead pencil fabrication which have a density between 0.3 and 0.6 g/cm3. By contrast, the strength is lower than that of wood. Anisotropic properties such as those present in wood cannot be produced in WPC.

In pencils with a lead sheathing made of WPC, it has additionally proven to be disadvantageous that a higher sharpening torque is necessary in order to sharpen the pencil since the physical properties in WPC are identical in all directions.

It has been found, when wood is replaced by isotropic WPC, that sufficient strength can indeed be set, however higher sharpening torques occur as a result.

High strength with simultaneously good sharpenability as demonstrated by wood has not yet been achieved with use of isotropic WPC. It can be noted that pencils consisting of leads and a sheathing made of WPC invariably constitute a compromise of strength and sharpenability.

Furthermore, DE-PS 801613 shows and describes lead pencil encasements for core pins, the fiber material being arranged so as to run parallel to the pencil axis. A high breaking strength and uniform cutting properties during the sharpening process can thus be achieved or set.

A disadvantage however with pencils of this type has proven to be the fact that, as a result of the orientation of the fibers, the production method is very difficult and sheathed pencils of this type have a relatively high weight. In addition, the achieved compromise between strength and sharpenability is not satisfactory for the operator or user.

A method for producing pencils is known from EP 1150847 B1, in which lead and lead encasement are produced in the method of coextrusion. Both lead and the encasement thereof consist of thermoplastic.

A disadvantage with the pencils produced in this way is that they have a very high weight and the sharpening torque for the user is unacceptably high. With products of this type, a lot of material is used, which makes the production of these products expensive in addition.

SUMMARY OF THE INVENTION

An object of the invention is therefore to create a writing, drawing, painting or marking device that does not have the disadvantages of the known prior art, the writing, drawing, painting or cosmetic device comprising a honeycomb body, which, besides a low weight and low material use, has a higher strength perpendicular to the honeycomb structure.

A further object of the invention is to create a writing, drawing, painting or marking device with lead held non-displaceably in encasements, said device comprising at least one honeycomb body, the device having a high strength/flexural strength with simultaneously very good sharpenability.

A further object of the invention is to create a method that is economical in every regard for effective and cost-effective production of writing, drawing, painting or cosmetic devices of this type and elements or intermediate products for devices of this type.

The object is achieved in that a writing, drawing, painting or cosmetic device has at least one honeycomb body, the honeycomb body consisting at least of a main body, the at least one honeycomb body/main body containing a multiplicity of hollow longitudinal structures axially parallel to one another, the at least one honeycomb body being formed from extruded plastic material and/or from composite material consisting of a natural material and a plastic material.

It has surprisingly been found that, in an anisotropy created in this way in materials used to form what are known as honeycomb bodies made of plastic material and/or composite material consisting of a natural material and a plastic material, in particular with use of wood substitute materials, an optimization/increase of the flexural strength with load occurring perpendicular to the longitudinal structures can be achieved by means of hollow longitudinal structures.

It has also been found that, with writing, drawing, painting, marking or cosmetic devices having coloring leads held non-displaceably/secured against displacement in honeycomb bodies/encasements, not only is the flexural strength perpendicular to the longitudinal axis/longitudinal structures improved, but also the sharpenability is significantly improved. The multiplicity of hollow structures of the honeycomb body are preferably oriented or arranged parallel to the longitudinal axis of the device. The outer contour of the devices may be round, oval, elliptical, polygonal, or star-shaped or may have a different shape, for example.

The honeycomb body is in this case formed as an encasement of a coloring lead, the encasement and the coloring lead being produced or formed by means of coextrusion. Examples of devices of this type having honeycomb bodies are lead pencils, colored pencils or cosmetic pencils.

The honeycomb body may also be formed however as an intermediate product for the production of devices. The small boards from the lead pencil production are mentioned as an example of an intermediate product, the leads being glued in between two small boards of this type. These small boards could likewise be provided with hollow longitudinal structures. Small boards/honeycomb bodies of this type are produced via thermoplastic extrusion.

It has also been demonstrated that a significant improvement of strength and sharpenability is basically independent of the cross-sectional profile of the hollow longitudinal structures in the honeycomb body.

Examples of possible cross sections of the axially parallel hollow longitudinal structures formed in the honeycomb bodies are, for example, round, elliptical, polygonal and/or star-shaped cross sections.

BRIEF DESCRIPTION OF THE DRAWING

FIGS. 1 and 2 serve to clarify the solution according to the invention.

DETAILED DESCRIPTION OF THE INVENTION

Figure 1:
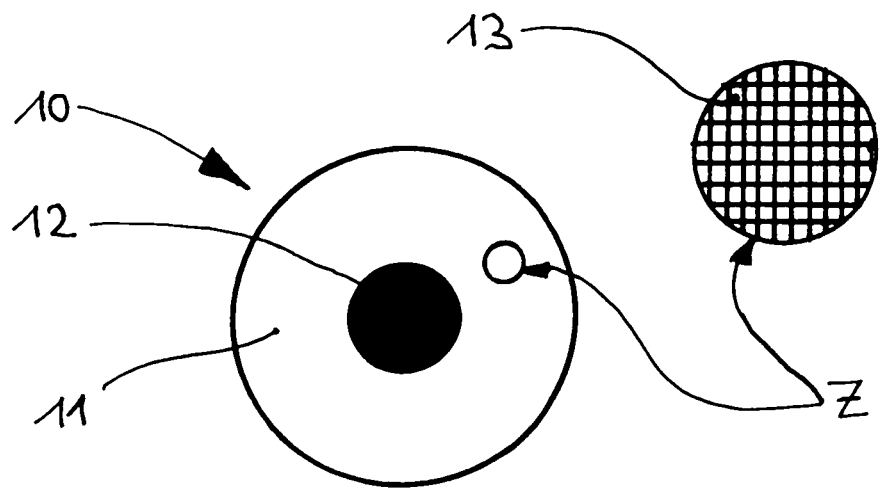
FIG. 1 is a plan view of a wood-cased pencil.

FIG. 1 shows a plan view of a wood-cased pencil 10, which is composed of a lead 12 and a honeycomb body/encasement 11 surrounding said lead 12 concentrically. The honeycomb structure/encasement 11 has a large number of hollow longitudinal structures 13 and in this embodiment is, or can be, referred to as a square tube structure. A detail Z has been illustrated in an enlarged manner in order to clarify the honeycomb structure.

It is generally noted that the distribution/arrangement of the longitudinal structures in the honeycomb body/encasement have to be distributed preferably uniformly over the cross section so that the pencil ideally has the same strength values in all directions perpendicular to the longitudinal structures.

The distribution/arrangement of the longitudinal structures in the honeycomb body can also be formed differently radially.

Figure 2:
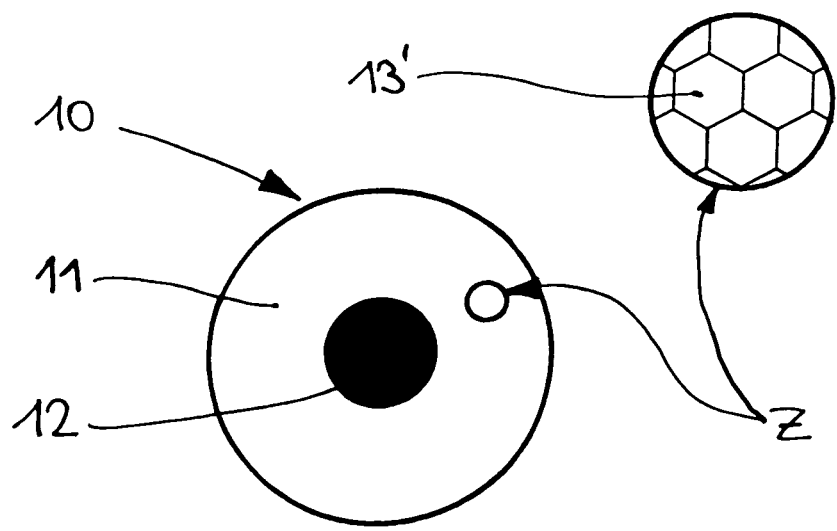
FIG. 2 is a plan view of another embodiment of the invention.

FIG. 2 shows an alternative embodiment of a device/pencil 10, with hollow longitudinal structures 13' in the encasement/honeycomb body 11. To clarify the honeycomb structure, a detail Z has been illustrated in an enlarged manner.

It has been found that the hollow longitudinal structures do not have to be formed over the entire cross section of the encasement. An improvement in strength with improved sharpenability can also be determined/measured even with partial interspersion of the encasement/honeycomb body with longitudinal structures.

Very good results have also then been measured for example when the hollow longitudinal structures are formed over the entire cross section of the honeycomb body/encasement and the size of the honeycomb/longitudinal structures corresponds to that with commercially available catalytic converter inserts. This corresponds to wall thicknesses between the hollow longitudinal structures smaller than 100 µm.

It is also possible however to form the wall thicknesses between the hollow structures and the cross-sectional areas of the hollow longitudinal structures so as to be larger than those of catalytic converters, since the desired effect for achieving the object can be measured in almost any embodiment, this being independent of the cross-sectional shape of the hollow longitudinal structures. It is noted that different hollow space profiles in the cross section of a body can also be combined.

It has additionally been shown that longitudinal structures located in the edge region of the encasement/honeycomb body surface can also be cut to size, whereby undercut contours can also be produced depending on cross-sectional shape.

Irrespective of the above-mentioned advantages of the solution according to the invention, a further advantage is that honeycomb bodies/device elements formed in this way and the devices provided therewith have a significantly lower weight and at the same time material is saved during production thereof. In the case of devices having honeycomb bodies, a material saving of up to 80% by weight can be achieved, depending on the number and cross-sectional area of the longitudinal structures and also the wall thicknesses between the structures compared to a body made of solid material.

In this case, it should be noted that means for impregnation, coloring or improvement of the sharpenability can also be introduced without difficulty via the hollow longitudinal structures of the honeycomb bodies, since the hollow longitudinal structures can be formed in a capillary manner due to their dimensioning.

Three examples for a possible composition of a wood substitute material will be detailed hereinafter by way of example and can be used in the production of anisotropic encasements.

EXAMPLE 1

Composite Material Consisting of a Natural Material and a Plastic Material 15-30% by weight of at least one polymeric binder,
50-80% by weight of at least one organic filler,
0-20% by weight of at least one inorganic filler,
0.5-5% by weight of at least one adhesion-promoting agent,
1-30% by weight of at least one wax,
0-10% by weight of at least one colour pigment, and
0-10% by weight of at least one additive.

EXAMPLE 2

Composite Material Consisting of a Natural Material and a Plastic Material at least 50% by weight of natural material(s),
0 to 20% by weight of inorganic filler(s),
0 to 10% by weight of adhesion-promoting agent,
0 to 10% by weight of color pigment(s),
0 to 10% by weight of wax(es),
0 to 5% by weight of additive(s),
the rest being formed by plastic material(s) as polymeric binder.

EXAMPLE 3

Plastic Material at least 40% by weight of plastic material(s) as polymeric binder,
   0 to 30% by weight of inorganic filler(s),
   0 to 20% by weight of color pigment(s),
   0 to 15% by weight of wax(es),
   0 to 5% by weight of additive(s).

The plastic material/polymer in the composite material consisting of a natural material and a plastic material used in the examples is a polymer from the group of polyolefins, polystyrenes, styrene acrylonitriles, acrylonitrile butadiene styrenes, polycarbonates, polyvinyl chloride and/or from the group of biopolymers.

Wood, agricultural crops, bamboo, kernel meal and/or cellulose present in powder form, meal form and/or fiber form are used as organic fillers/natural materials in the composite material consisting of a natural material and a plastic material, the size of the fillers having a maximum particle size of 250 μm, in particular of at most 100 μm.

To set the brittleness and the sliding properties when sharpening, it is advantageous if at least one inorganic filler from the group of phyllosilicates, talc, boron nitride, steatite and graphite is used.

Colored and also white pigments can be used as color pigments. For example, titanium dioxide can be used to lighten the honeycomb body.

It has proven to be advantageous in composite materials consisting of a natural material and a plastic material if an adhesion-promoting agent is used to bind the natural material to the plastic material. A polyethylene with grafted maleic acid anhydride or a propylene with grafted maleic acid anhydride are examples of adhesion-promoting agents.

The used waxes comprise amide waxes, fatty acids, such as stearic acid and palmitic acid, montan wax, stearates, fatty acid esters and/or paraffin waxes. Additives, such as lubricants, plasticizers, surface-active substances, thermal stabilizers and/or UV stabilizers, can additionally be added to the formulations.

The effect of the rise in strength with simultaneously improved sharpenability in writing, drawing, painting, marking and/or cosmetic devices, depending on the material prepared, is indeed greater than with a corresponding solid material, however the values of the degree of improvement may vary depending on the material used. The improvement by the solution according to the invention is based purely on a technical embodiment and can be referred to as material-independent.

A lead pencil, colored pencil, marker pencil or cosmetic pencil that has a honeycomb body/encasement formed from a wood substitute material or plastic material, wherein, due to hollow longitudinal structures, an anisotropy is formed, can be sharpened using a commercially available hand-held sharpener with low application of force and at the same time has the sufficient strength with low weight.

In order to produce a comparability with measurements for sharpenability, samples made of solid material (wood, wood substitute material) and a honeycomb body made of composite material consisting of a natural material and a plastic material with hollow longitudinal structures were produced and sharpened. Here, the use of a sample assessed as being easily sharpenable means that a pencil produced therefrom, consisting of an encasement made of wood, wood substitute material or honeycomb body made of composite material consisting of a natural material and a plastic material and lead, can likewise be sharpened with low application of force.

A sample is generally deemed to be sharpenable with low application of force if, as in the test, a pencil has a 'sharpening torque' of less than 9 Ncm during the test or during the sharpening process.

The sharpening torque is determined in a test machine developed for this purpose, in which a sample in the form of a solid body made of wood, a solid body made of wood substitute material, and a honeycomb body made of composite material consisting of a natural material and a plastic material is sharpened continuously for a period 20 s long. The average torque [in Ncm] established during the sharpening process that is necessary to continuously sharpen a sample having a diameter of 7.6±0.2 mm at a speed of 43 rpm with a cone-shaped tip already provided, that is to say already sharpened at the desired angle, in a commercially available sharpener with new blade is referred to as the sharpening torque.

Figure 3:
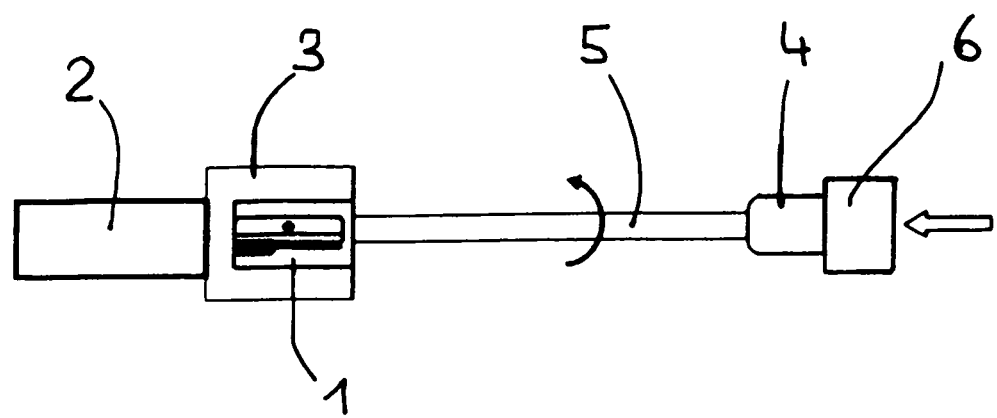
FIG. 3 schematically illustrates a torque measuring principle.

The principle of a device for measuring the sharpening torque is illustrated in FIG. 3 for explanation. A sharpener 1 is secured for this purpose in a holder 3 connected to a torque-measuring device 2. A sample 5 is provided rotatably in a mount 4 and is introduced into the sharpener 1. The rotating sample 5 is advanced pneumatically in the direction of the sharpener 1 by means of a feed arrangement 6, which acts on the mount 4 of the sample 5 with a feed force of 20 N (see arrow to the right in the image). The torque measured by the torque-measuring device 2 during the sharpening process of the sample 5 is recorded and averaged over the duration of the test in order to determine the sharpening torque.

The fact that the sharpenability of samples in the embodiment according to the invention is considerably improved is clear from the following table.

In this case, the samples according to the prior art DE 102008034013 A1 and the honeycomb body with square tube structure according to FIG. 1 have the following composition:

| | |
|---|---|
| polyethylene high-density (PE-HD) | 25.0% by weight |
| wood fibres | 65.0% by weight |
| polyethylene with grafted maleic acid anhydride | 2.0% by weight |
| amide wax | 3.0% by weight |
| stearic acid | 3.0% by weight |
| titanium dioxide | 2.0% by weight |

| | Natural wood | Wood substitute materials according to DE 102008034013 A1 | Honeycomb body with hollow structures (according to the invention) |
| --- | --- | --- | --- |
| Sharpening torque Ncm | 7 to 12 | 9 to 10 | <9 |

Furthermore, a use of a honeycomb body/encasement according to the invention made of wood substitute material/composite material consisting of a natural material and a plastic material with hollow longitudinal structures for producing wood-cased pencils which have a lead made of eraser material and a sheathing for the lead is ideal, the conventional wood sheathing or the sheathing made of the wood substitute material being replaced by the honeycomb body/sheathing according to the invention.

It is particularly preferable in the production of pencils with coloring leads or leads made of eraser material if the honeycomb body/sheathing according to the invention, consisting of wood substitute material/composite material consisting of a natural material and a plastic material with hollow longitudinal structures, is formed by coextrusion. Here, the lead and the sheathing are formed in situ in an extruder and are output together via a mouth piece in the respective desired geometry in the form of an endless strand, which only still has to be divided into individual pencils. The honeycomb body and lead are coextruded.

Extrusion is a continuous production method and is therefore extremely suitable for cost-effective mass production of honeycomb bodies per se and of writing, drawing, painting, marking or cosmetic devices comprising a honeycomb body.

Extrusion or coextrusion occur via a special honeycomb-structure tool, as is known from brick production or catalytic converter construction, for forming hollow chamber profiles with longitudinal structures.

The extrusion methods provide the advantage that practically all cross-sectional geometries of pencils can be produced.

Another possibility lies in sheathing a lead that is already provided, this process possibly also occurring by means of extrusion via crosshead dies, similarly to cable sheathing.

Ball-point pens, fine lead pencils or fiber pens may also comprise elements that are formed as honeycomb bodies. To this end, the honeycomb-shaped semifinished products or honeycomb bodies are also produced by means of extrusion.

The invention claimed is:

1. A writing, drawing, painting or cosmetic device, comprising: at least one honeycomb body, the at least one rigid honeycomb body being formed from a composite material consisting of a natural material and a plastic material, wherein the at least one honeycomb body includes a plurality of hollow longitudinal structures axially parallel to one another, wherein the hollow longitudinal structures form a tube structure; and a coloring lead, wherein the at least one honeycomb body is formed as an encasement of the coloring lead.

2. The device according to claim 1, wherein the plurality of hollow longitudinal structures of the honeycomb body are oriented parallel to a longitudinal axis of the device.

3. The device according to claim 1, wherein the longitudinal structures in the honeycomb body have cross-sections that are round, elliptical, polygonal and/or star-shaped.

4. The device according to claim 1, wherein the device is a lead pencil, colored pencil or cosmetic pencil.

5. The device according to claim 1, wherein the composite material consisting of a natural material and a plastic material contains
  at least 50% by weight of natural material(s),
  0 to 20% by weight of inorganic filler(s),
  0 to 10% by weight of adhesion-promoting agent,
  0 to 10% by weight of color pigment(s),
  0 to 10% by weight of wax(es),
  0 to 5% by weight of additive(s),
a remainder being formed by plastic material(s) as polymeric binder.

6. The device according to claim 1, wherein the plastic material of the composite material consisting of a natural material and a plastic material is a polymer selected from the group consisting of polyolefins, polystyrenes, styrene acrylonitriles, acrylonitrile butadiene styrenes, polycarbonates, polyvinyl chloride and/or from the group of biopolymers.

7. The device according to claim 1, wherein the device has an outer contour that is round or polygonal.

8. A method for producing a writing, drawing, painting or cosmetic device according to claim 1, comprising the step of extruding the honeycomb body.

9. The device according to claim 1, wherein the lead is held non-displaceably in the encasement.

10. The device according to claim 9, wherein the encasement and the coloring lead are coextruded.

11. The device according to claim 1, wherein the natural material of the composite material consisting of a natural material and a plastic material consists of wood and/or cellulose.

12. The device according to claim 11, wherein the wood and/or cellulose is/are present in powder form, meal form and/or fiber form.

13. A method for producing a writing, drawing, painting or cosmetic device according to claim 9, comprising the step of coextruding the honeycomb body and the lead.

* * * * *